(No Model.)
10 Sheets—Sheet 1.

G. E. HUNTER.
PROFILING MACHINE.

No. 508,716.
Patented Nov. 14, 1893.

Witnesses
Chas. J. Williamson.
Henry C. Hazard.

Inventor
George E. Hunter, by
Prindle & Russell, his Attys (No Model.)　　　　　　　　　　　　　　　　　　　　10 Sheets—Sheet 3.

G. E. HUNTER.
PROFILING MACHINE.

No. 508,716.　　　　　　　　　　　　Patented Nov. 14, 1893.

Witnesses
Chas. J. Williamson,
Henry C. Hazard.

Inventor
George E. Hunter, by
Prindle and Russell, his Att'ys (No Model.) 10 Sheets—Sheet 6.
G. E. HUNTER.
PROFILING MACHINE.

No. 508,716. Patented Nov. 14, 1893.

Witnesses
Chas. J. Williamson
Henry C. Hazard

Inventor
George E. Hunter, by
Dindle and Russell, his Attys (No Model.)　　　　　　G. E. HUNTER.　　　10 Sheets—Sheet 7.
PROFILING MACHINE.

No. 508,716.　　　　　　　　Patented Nov. 14, 1893.

(No Model.) 10 Sheets—Sheet 8.

G. E. HUNTER.
PROFILING MACHINE.

No. 508,716. Patented Nov. 14, 1893.

Witnesses
Chas. J. Williamson.
Henry C. Hazard.

Inventor
George E. Hunter by
Crindle and Russell, his Attys (No Model.) 10 Sheets—Sheet 10.
G. E. HUNTER.
PROFILING MACHINE.
No. 508,716. Patented Nov. 14, 1893.
Fig. 12.
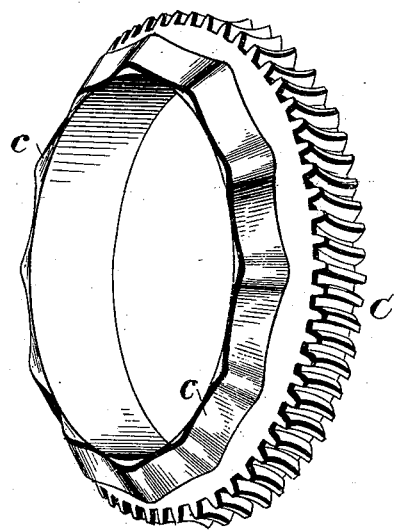
Fig. 13.      Fig. 14.
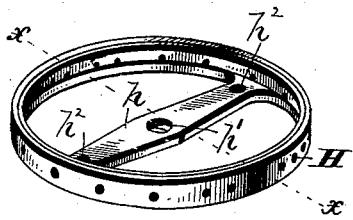 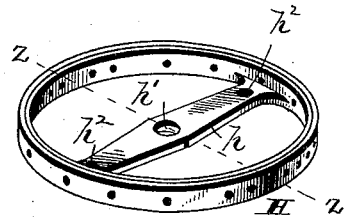
Fig. 15.      Fig. 16.
 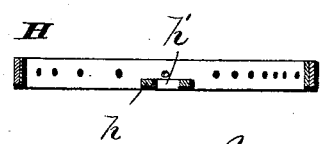
Witnesses
Chas. J. Williamson.
Henry C. Hazard.
Inventor
George E. Hunter, by
Prindle and Russell, his Attys.

United States Patent Office.

GEORGE E. HUNTER, OF ELGIN, ASSIGNOR TO THE ELGIN NATIONAL WATCH COMPANY, OF CHICAGO, ILLINOIS.

PROFILING-MACHINE.

SPECIFICATION forming part of Letters Patent No. 508,716, dated November 14, 1893.

Application filed April 15, 1893. Serial No. 470,521. (No model.)

*To all whom it may concern:*

Be it known that I, GEORGE E. HUNTER, of Elgin, in the county of Kane, and in the State of Illinois, have invented certain new and useful Improvements in Profiling-Machines; and I do hereby declare that the following is a full, clear, and exact description thereof, reference being had to the accompanying drawings, in which—

Figure 1:
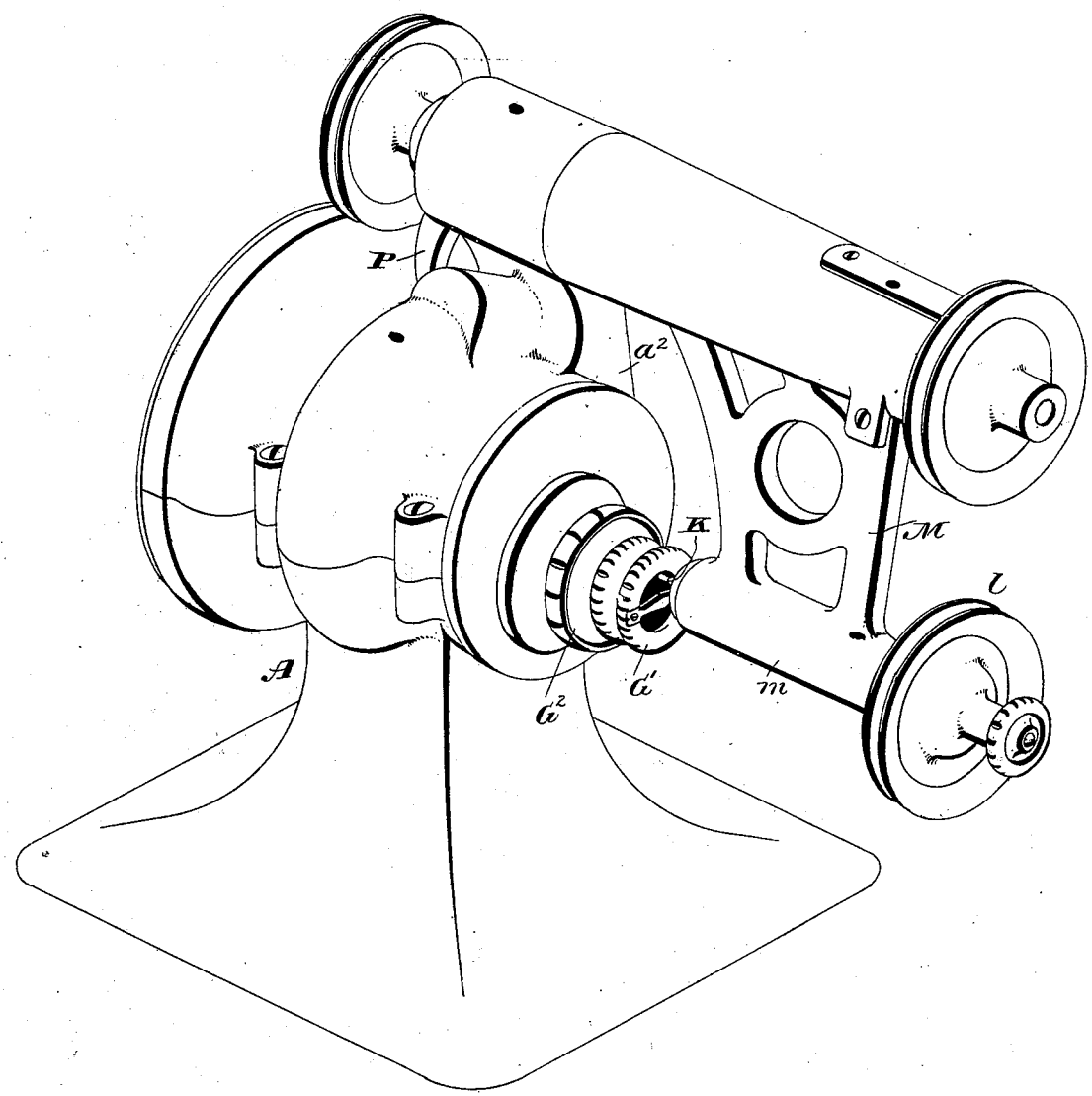
Figure 2:
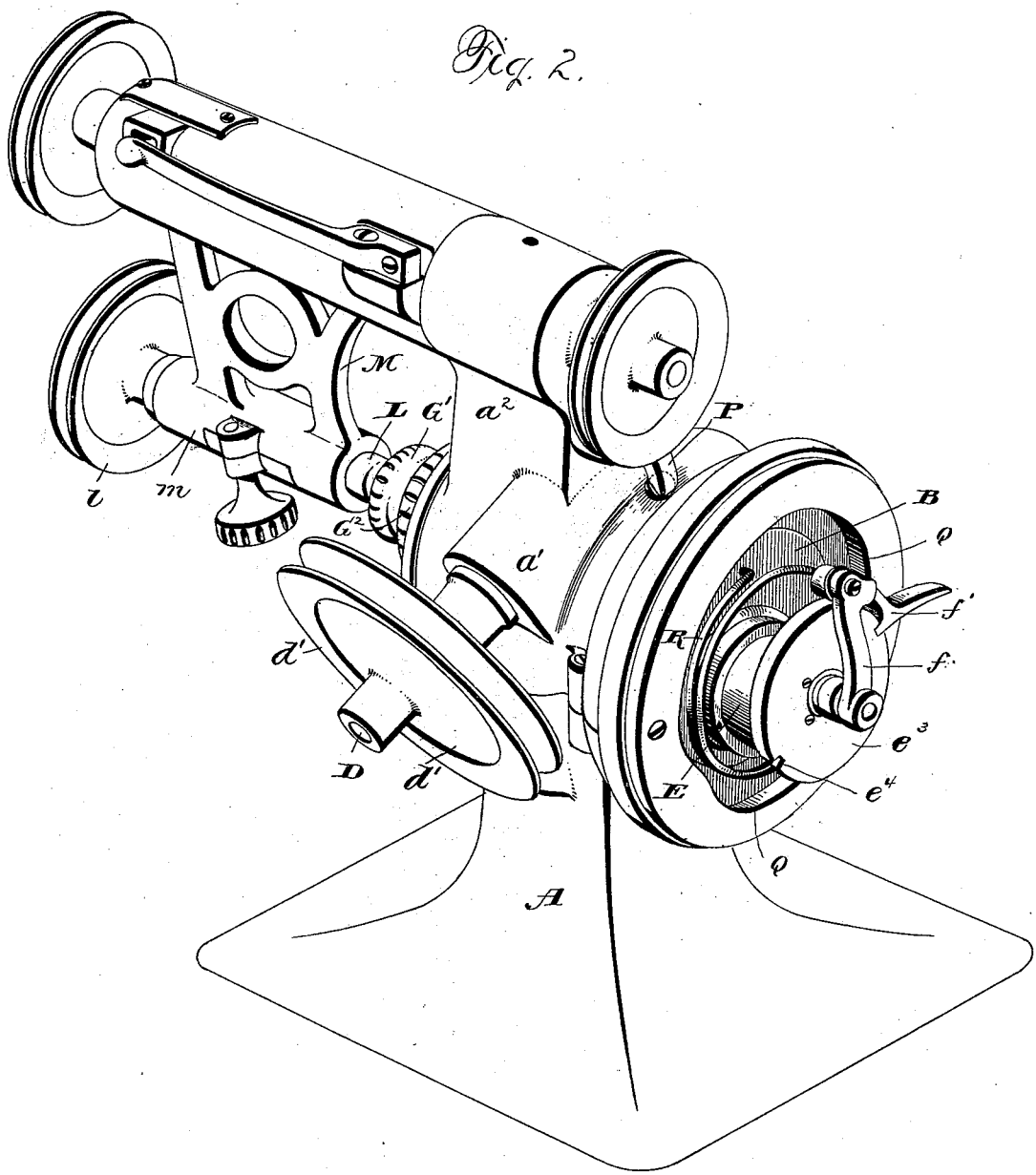
Figure 3:
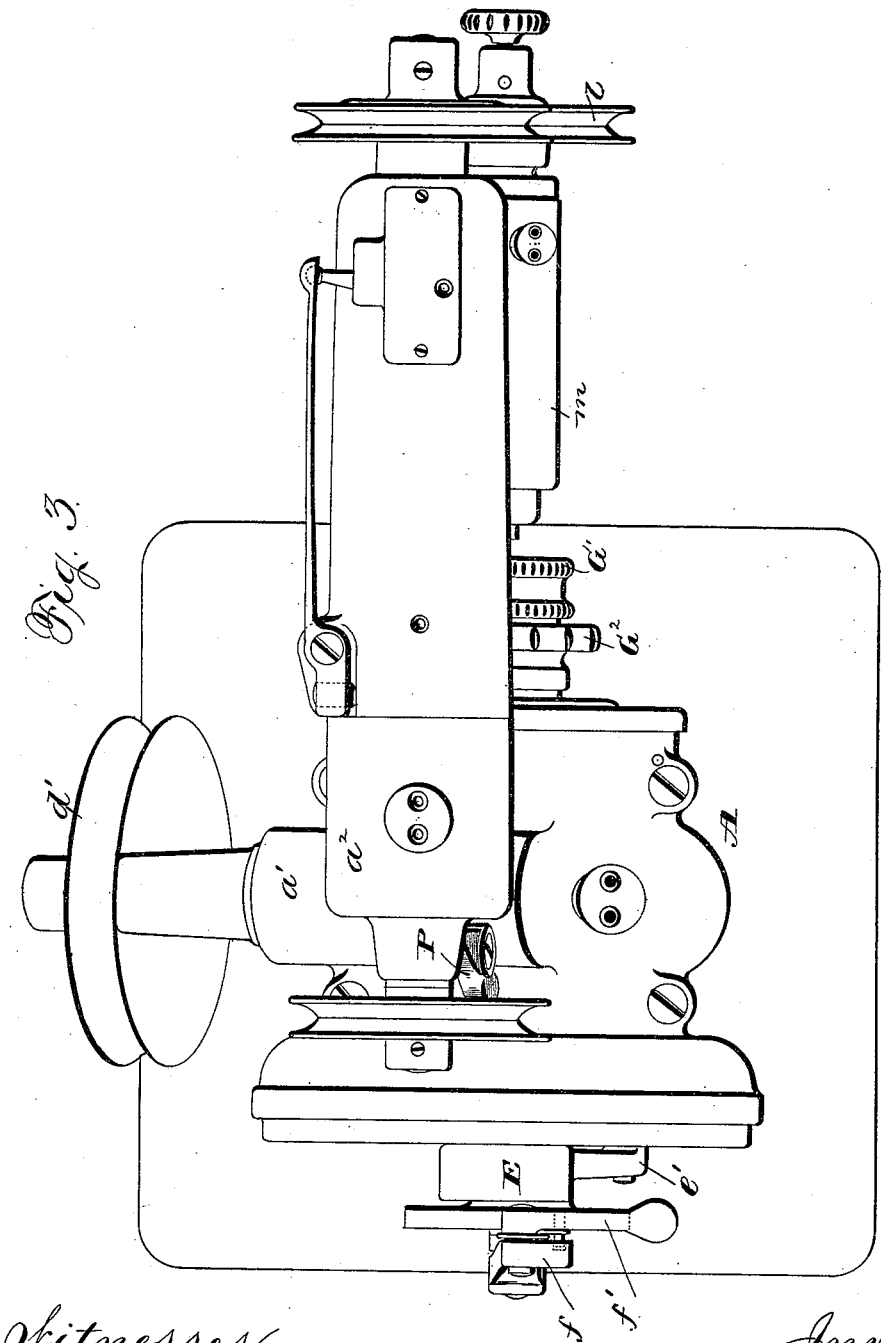
Figure 4:
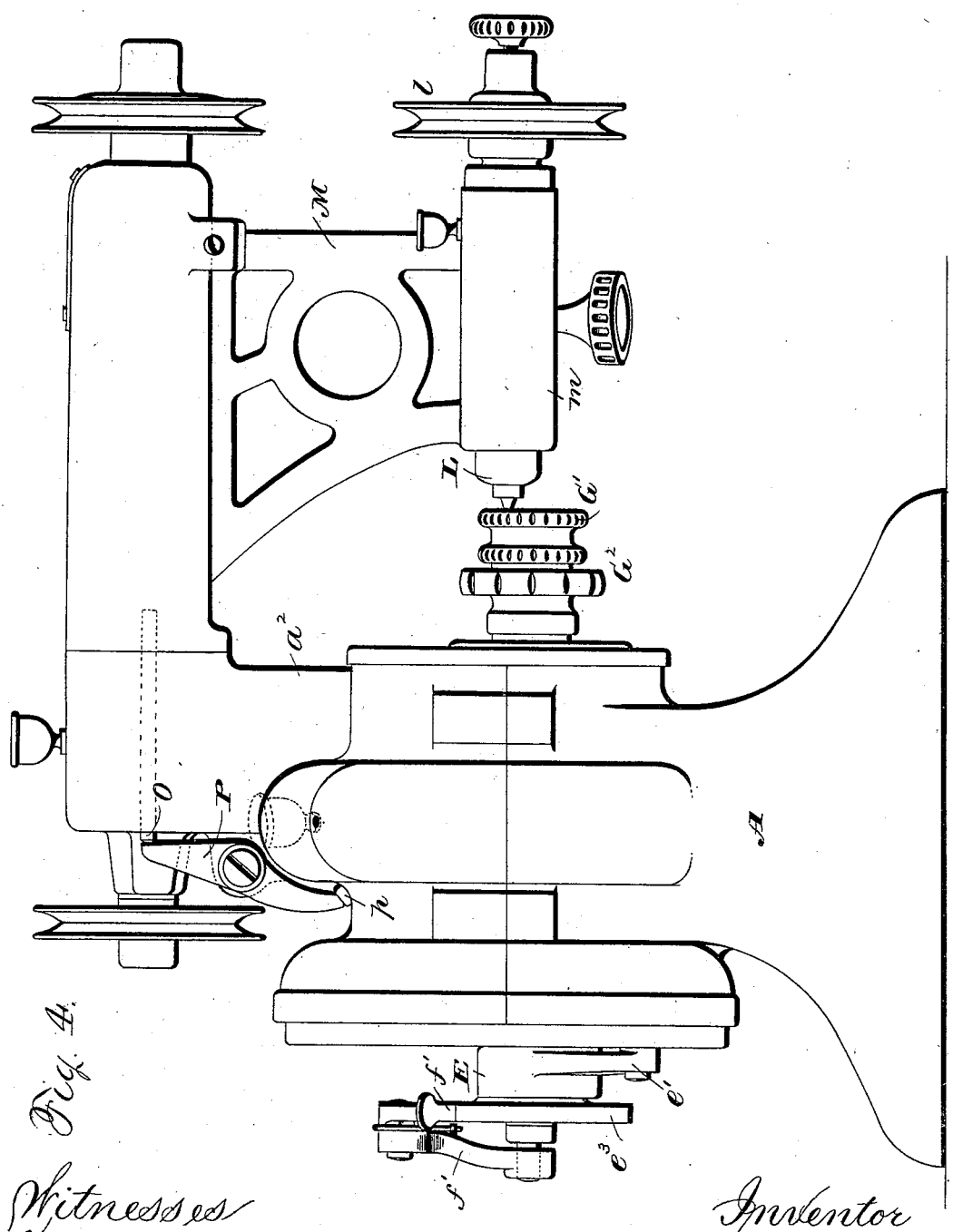
Figure 5:
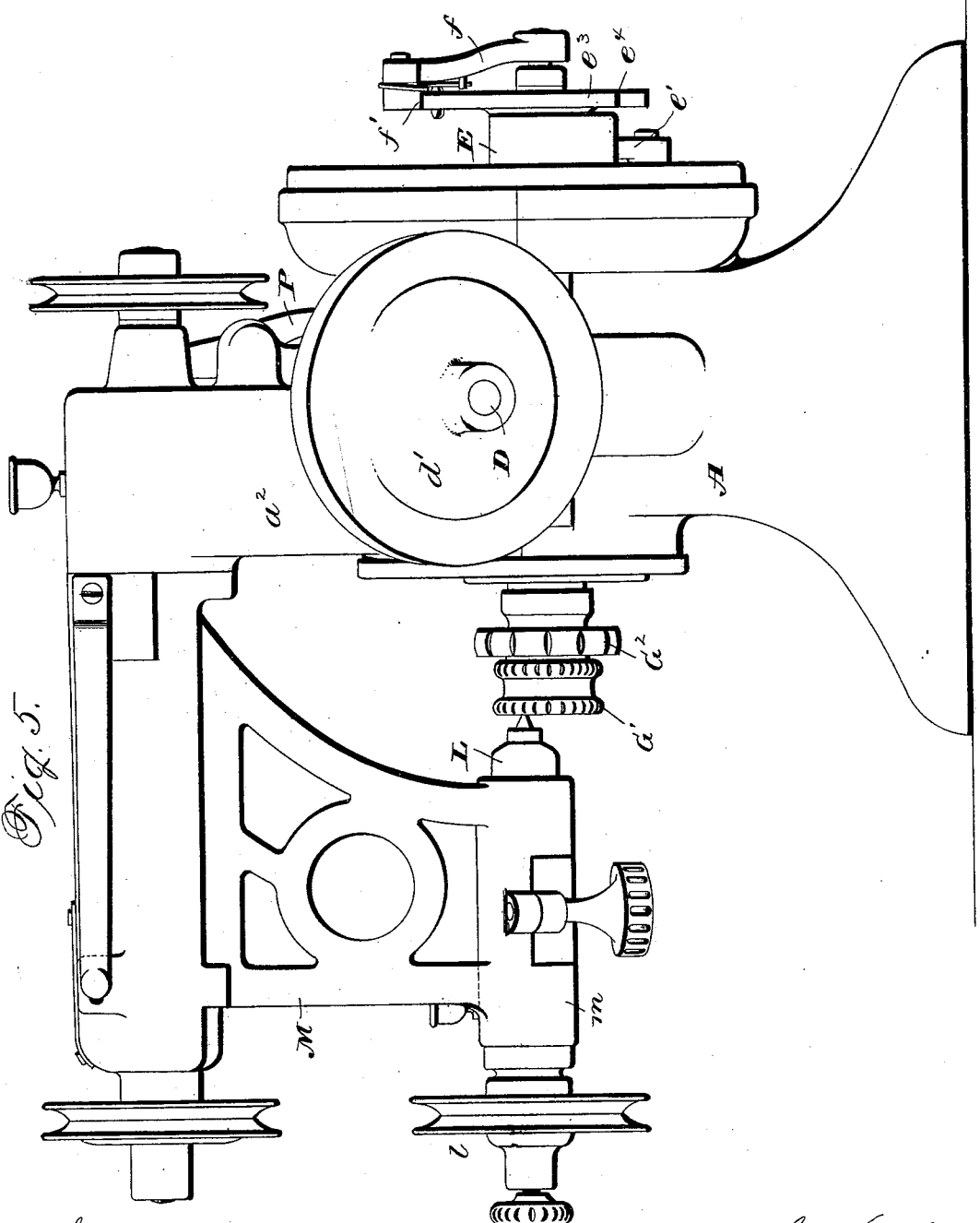
Figure 6:
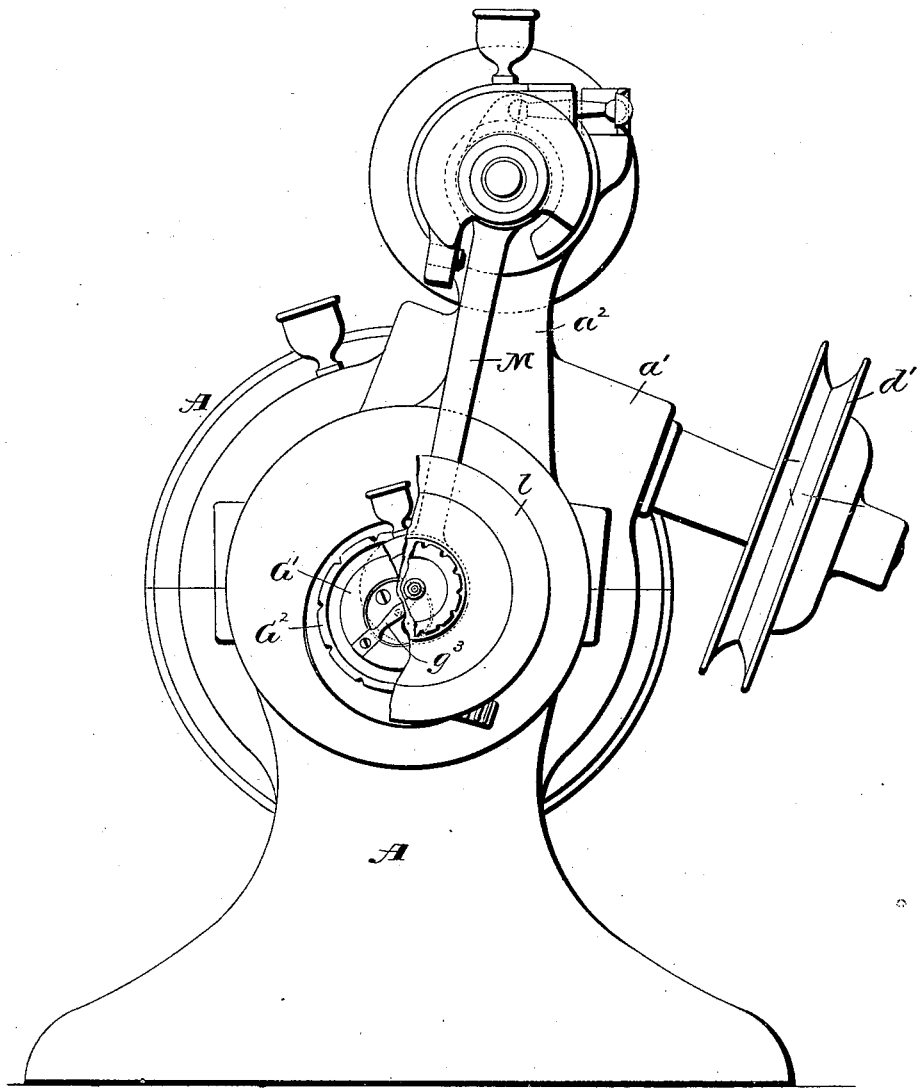
Figure 7:
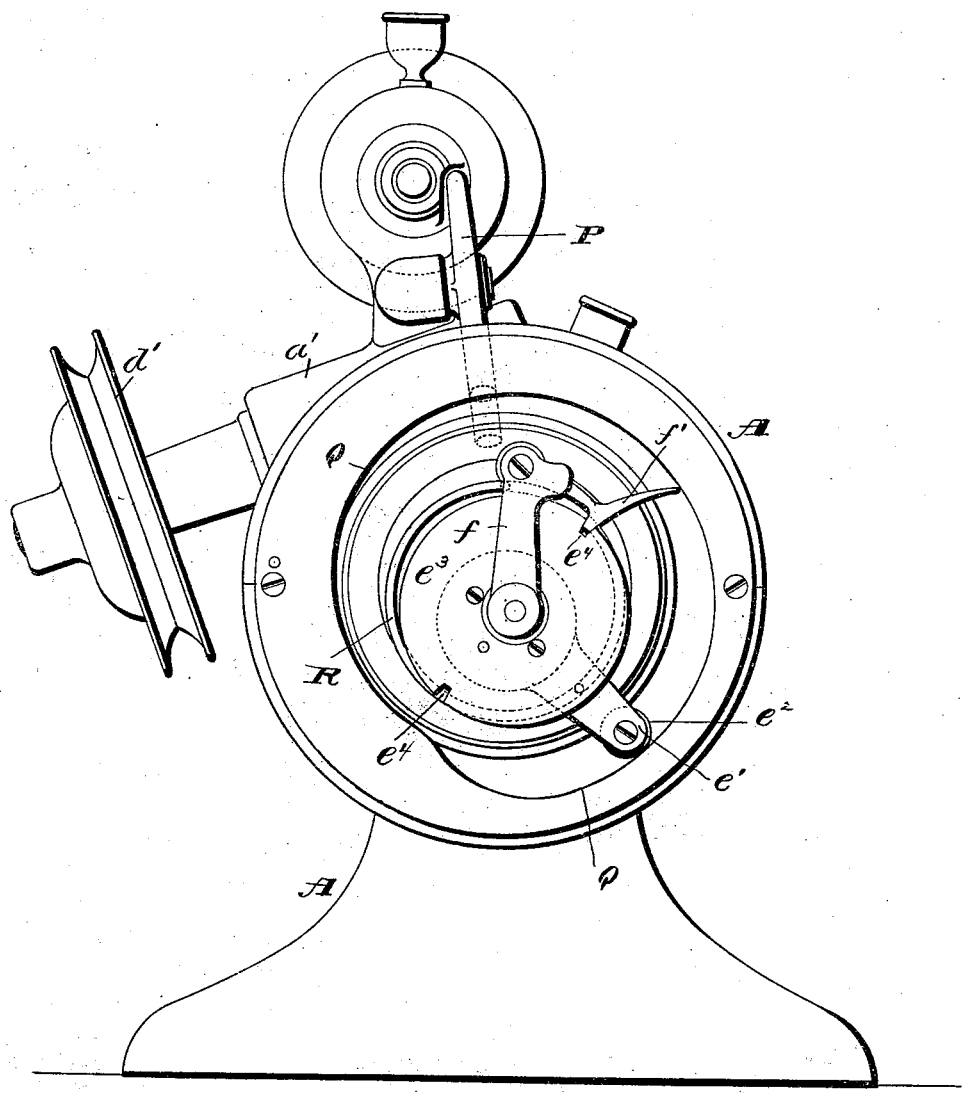
Figure 8:
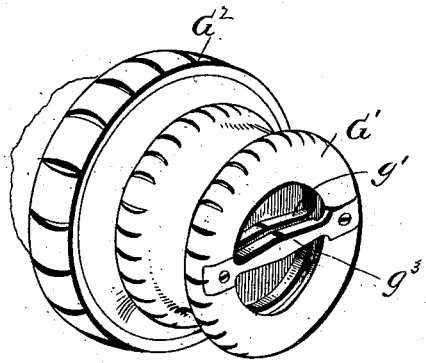
Figure 9:
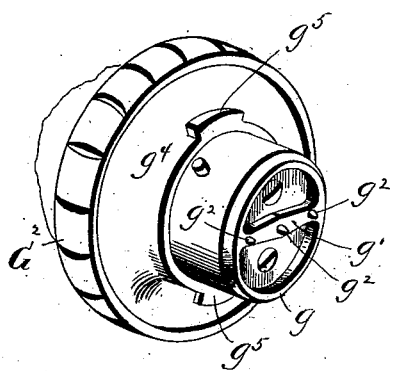
Figure 10:
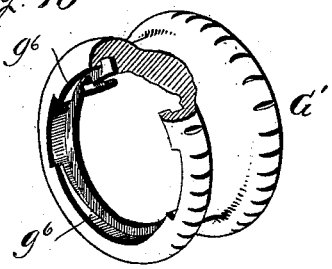
Figure 11:
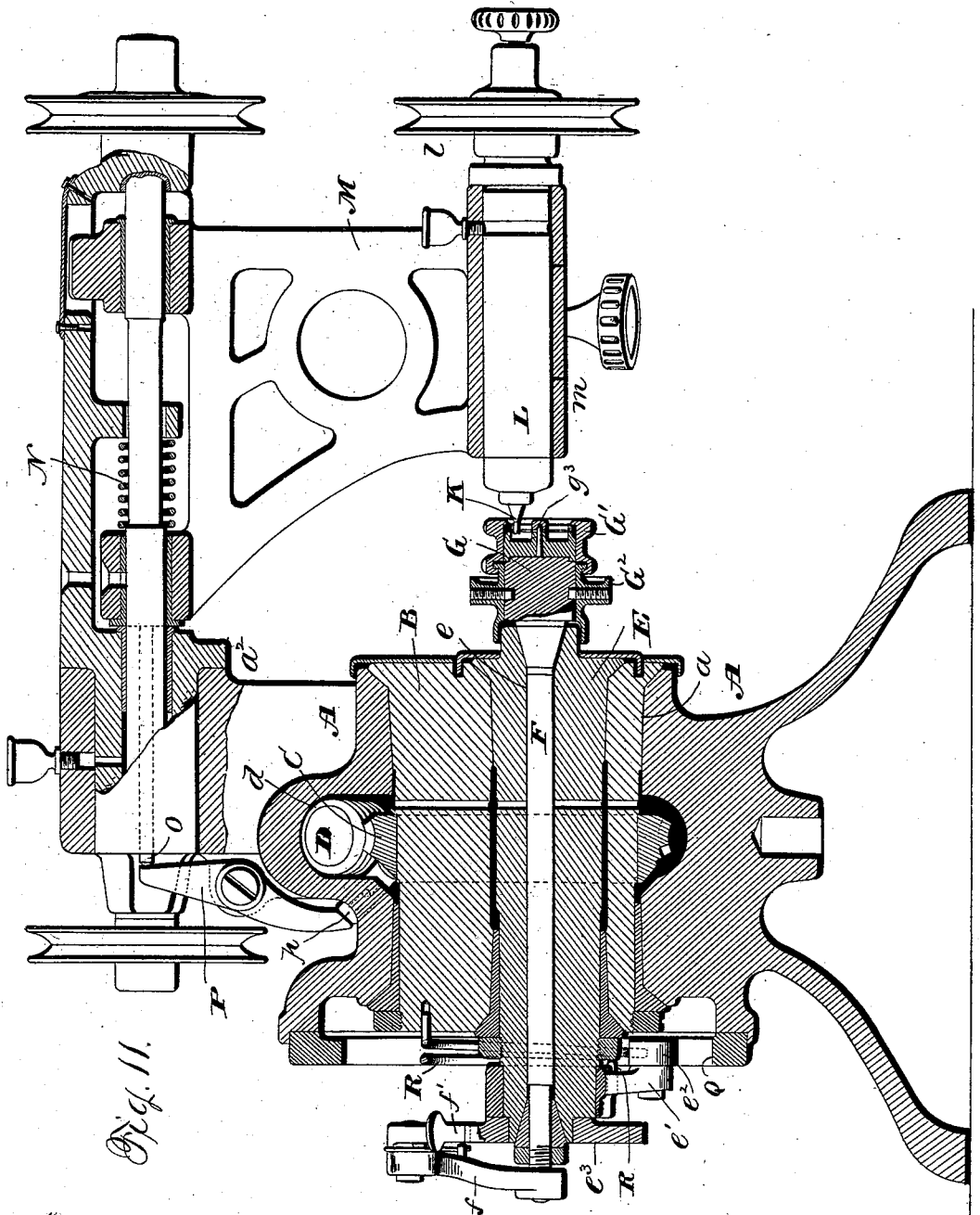

Figure 1 is a perspective view from the front side of my machine as arranged for use; Fig. 2 a like view of the same from the rear side. Fig. 3 is a plan view of the machine from the upper side. Fig. 4 is a front elevation of the same. Fig. 5 is a rear elevation of said machine. Figs. 6 and 7 are, respectively, elevations of the front and rear ends of the same. Fig. 8 is an enlarged perspective view from the front of the chuck used for holding the work. Fig. 9 is a like view of the same with the cap removed. Fig. 10 is a broken, perspective view of said cap from the rear. Fig. 11 is a central longitudinal section of the machine through the axis of the revolving head, and the spindles of the profile and cutter and the pivotal support for the latter. Fig. 12 is a perspective view of the combined worm and cam wheel employed for operating the revolving head and the cutter spindle. Figs. 13 and 14 are perspective views, respectively, of a balance wheel blank before and after being operated on by the profiling machine; and Figs. 15 and 16, are sections upon lines $x$—$x$ and $z$—$z$ respectively of said Figs. 13 and 14.

Letters of like name and kind refer to like parts in the several figures.

The design of my invention is to provide improved means for profiling or finishing articles, such as balance wheel blanks that have been roughed out by punching or otherwise, and to this end said invention consists in the mechanism having the construction, substantially as and for the purpose hereinafter specified.

In the carrying of my invention into practice I employ a frame A, which has the form shown in Figs. 1 to 3, and is provided with an axial opening $a$ that receives and journals a cylindrical head B which head has such construction as to enable it to revolve freely therein, without longitudinal motion or endshake, and is provided with a centrally arranged worm wheel C that is engaged by a worm $d$ upon a shaft D, which shaft is journaled within a rearward and, preferably, downward extending arm $a'$ of said frame, the arrangement being such, that by the rotation of the shaft through a pulley $d'$ upon its rear end, and a belt from some source of power, said head will be given a constant rotary motion in one direction.

Journaled eccentrically within the head B, parallel with the axis thereof is a spindle E, which has such usual construction as to enable it to revolve therein freely, without end motion, and is provided with an eccentrically arranged longitudinal opening $e$, within which is, in turn, journaled a second spindle F that is provided upon its front end with a work-holding chuck G, that for use in connection with watch balances, has formed upon its front end an annular face $g$ which corresponds generally to the form and dimensions of the rim H of a watch balance, and a cross bar $g'$ that, in like manner, corresponds to the cross bar $h$ of such balance. Said bar $g'$ is provided at its center and at or near its ends with three pins $g^2$ and $g^2$ which are adapted to fit into the staff opening $h'$ and two other openings $h^2$ and $h^2$ that are located within the ends of the cross bar $h$ of said balance and operate to hold the latter accurately in place upon said chuck.

Upon and over the end of the chuck G is fitted a cap G', which at its front end is cut away until it corresponds in shape to the shape of the former and is provided with three openings $g^3$ and $g^3$ that correspond in size, shape and location with the like features of the pins $g^2$ and $g^2$, so that when said cap is placed in position with said openings in engagement with said pins, the lines of its openings correspond generally to the lines of the raised parts of said chuck. Said cap, when in position is locked in place by means of a nut $G^2$ which is journaled upon said chuck, and upon its front side is provided with a hub $g^4$ that has two or more inclined lugs $g^5$ and $g^5$ which are adapted to project into the inner end of said cap, and by a partial rotation of said nut, to engage with similar, oppositely inclined lugs $g^6$ and $g^6$, the whole forming an ordinary bayonet lock, and operating to draw said cap toward said chuck and to cause it to firmly clasp between an interposed balance wheel. The edges of the openings in the cap G′ corresponding to the inner edge of the rim H of the balance wheel are slightly outside of the latter as they are not intended to serve as guides for the cutter and are cut away until below the line of the cross-bar, but the edges of said cross-bar have the exact dimensions and position requisite to enable them to furnish a guide for such cutter so as to enable the latter to give to said cross-bar the exact lateral outline and dimensions.

The cutter K has the form of an ordinary mill with peripheral teeth upon its end and a plain shank of equal size in rear of such toothed portion, and is contained within one end of a spindle L which spindle is journaled in the usual manner, within a housing $m$ and, by means of a pulley $l$ upon its opposite outer end, is adapted to be rotated. Said housing is formed upon the end of an arm M, which is pivoted within an arm $a^2$ that extends laterally from the upper side of the frame A in a line with the axial opening $a$, the construction being such as to enable said housing, with the spindle L to be swung within certain limits toward or from the front side of the machine, while held by means of a spring, with a yielding pressure at the rear limit of such motion. This arrangement of the cutter supporting devices is to enable said cutter to be pressed rearward against its guide and against the part to be operated upon, and the pressure upon the cutter is just sufficient to cause its teeth to do their work advantageously. In order that said cutter may work to still better advantage, the arm M has a certain amount of endwise motion within its supporting arm $a^2$ and is held with a yielding pressure at the inner limit of such motion by means of a spring N, and is moved intermittingly to the opposite limit of its motion by means of a rod O which is contained within said arm $a^2$ with one end projecting from the inner end of the same and its opposite end in engagement with the contiguous end of the arm M. A lever P, pivoted centrally upon the frame A, has one end in engagement with the outer end of said rod, and its opposite end in position for engagement directly by each of a series of teeth $c$ and $c$ upon the worm wheel C, or by a rod $p$ which is interposed between said lever end and teeth, and is free to move longitudinally the required distance, so that whenever said wheel is rotated each of said teeth—acting through said lever P and rod O—will press said cutter-supporting frame to the outer limit of its motion and then release it and permit it to be returned to the inner limit of its motion by the action of the spring N, such movement being repeated at regular intervals so as to give to the cutter a longitudinally reciprocating motion.

As the cutter K has but a limited range of movement, and only in a curved path from front to rear, it is necessary that the balance wheel being operated upon should be moved so as to bring the edges of its rim and cross-arm into engagement with said cutter. This necessitates an independent and variable movement of the spindle E which is secured by providing upon the rear end of the frame A, a cam track Q and securing to the rear end of said spindle an arm $e'$ that has upon its outer end a roller $e^2$ which bears upon and travels over said track. A spring R having one end attached to the end of the head B, and its opposite end to said arm $e'$, yieldingly connects said head with the spindle E, and while causing the former to rotate the latter permits of a considerable variation of their relative positions rotatively. The spindle F is connected with the spindle E by means of a disk $e^3$ which is secured upon the rear end of the latter, and an arm $f$ provided with a spring-pressed pawl $f'$ that engages with either of two oppositely located notches $e^4$ and $e^4$ that are cut into said disk. When now the head is caused to rotate, the cam through the medium of the roller arm $e'$ acts to maintain the surface being operated upon in a position approximately at a right angle to the arc through which the cutter swings.

In consequence of the eccentricity of the chuck spindle within the revolving head, and of the independent, variable motion given to the former, it will be seen that by varying the cam track any desired movement of the chuck may be obtained.

In the construction of a balance wheel blank H, the steel member has originally a cup shape, and the brass member a ring shape, and after the latter has been brazed upon the periphery of the former, they are placed in a lathe, and turned peripherally. The surplus metal in the bottom of the steel member is now removed by a punch so as to leave the arm $h$ in rough form, but as it is impracticable to make a die cut with sufficient accuracy, a burr is left around the inner periphery of the rim, which burr must be removed, and said arm $h$ given a perfect shape. To do this, the turned portion of the inner periphery of the rim H is made to act as a guide or profile and the plain shank of the cutter K bears against the same while its toothed portion removes said burr, but when operating upon the arm $h$ and the fillet at the intersection of each of its ends with said rim, then a profile becomes necessary and such is found in the cross bar $g^7$ of the cap G′.

In operating upon a balance wheel, the cutter frame is pressed longitudinally rearward, and swung laterally forward until the cutter is in a line with one of the recesses of the balance and is then permitted to resume its normal longitudinal position, after which the machine is started. By the action of the spring which controls, said cutter frame is pressed rearward so as to cause the cutter shank to press against its guide, while the toothed portion removes the surplus metal. The movements of the chuck cause the cutter to cut to shape one of the fillets, then to travel over the inner periphery of the rim until the second fillet is reached and then to travel over and shape the contiguous edge of the arm. When the opening within one side of the balance has been profiled the cutter is withdrawn, the spring pawl $g'$ is raised and the spindle F turned one half of a revolution so as to bring the second recess into position for the cutter.

While the profiling and cutting mechanisms are preferably combined, as shown, it will be obvious that if desired a second, swinging frame may be arranged in the rear of and connected with the cutter frame, and such supplemental frame connected with any desired form of profile, which revolves in unison with the work. Such arrangement may be desirable when the machine is used for other work than that hereinbefore described.

Having thus described my invention, what I claim is—

1. In a profiling machine, the combination of a continuously rotatable piece or part, and a work holder carried thereby and having a motion independent thereof, substantially as and for the purpose specified.

2. In a profiling machine, the combination of a rotatable piece or part, a work holder carried thereby and means to impart to said holder a variable motion relative to said piece or part, substantially as and for the purpose shown.

3. In a profiling machine, the combination of a continuously rotatable head, an eccentrically located work holder carried by said head, and means to impart to said holder a motion independent of that of the head, substantially as and for the purpose set forth.

4. In a profiling machine, the combination with a rotatable part, of an eccentrically located work holder or chuck carried by said part, and yieldingly connected thereto, and means for rotating said chuck relatively to the part carrying it, substantially as and for the purpose shown.

5. In a profiling machine, the combination with a rotatable part of an eccentrically located chuck carried by and yieldingly connected to said part, and a cam mechanism to cause a rotation of said chuck with relation to the part carrying it, substantially as and for the purpose set forth.

6. In a profiling machine, the combination with a rotatable part of an eccentrically located chuck carried by it, a spring connecting said part and chuck, and a cam mechanism to cause a rotation of the chuck with relation to the part carrying it, substantially as and for the purpose shown and described.

7. In a profiling machine, the combination of a rotary piece or part, a work holder or chuck carried thereby and having an independent, variable motion, a cutter carried by a movable frame and means to hold it yieldingly against the work, substantially as and for the purpose specified.

8. In a profiling machine, the combination of a rotatable piece or part, a work holder or chuck carried thereby and having an independent, variable motion, a cutter carried by a swinging frame and a spring to hold it yieldingly against the work, substantially as and for the purpose shown.

9. In a profiling machine, the combination with a rotatable part, of an eccentrically located work-holder or chuck, carried by said part, means for rotating said chuck with relation to the part carrying it, a cutter carried by a movable frame, and means to hold the cutter yieldingly against the work, substantially as and for the purpose set forth.

10. The combination of a rotary piece or part, means for continuously rotating the same, an eccentrically located work holder or chuck carried by said part, and a rotary and reciprocable cutter which reciprocates as it rotates in contact with the work, substantially as and for the purpose specified.

11. In a profiling machine, the combination of a rotatable head, a spindle, carrying a chuck, journaled eccentrically in such head, a yielding connection between the head and spindle, a cam, and an arm carried by the spindle engaging the cam, substantially as and for the purpose set forth.

12. A chuck for holding a balance wheel blank having central and eccentric pins, to engage openings in the former, in combination with means to hold said wheel blank upon the chuck, substantially as for the purpose set forth.

In testimony that I claim the foregoing I have hereunto set my hand this 30th day of March, 1893.

GEORGE E. HUNTER.

Witnesses:
   GEO. S. PRINDLE,
   CARLOS H. SMITH.